United States Patent
Tseng

(10) Patent No.: US 7,660,979 B2
(45) Date of Patent: Feb. 9, 2010

(54) MULTI-MODE COMPUTER SYSTEMS AND OPERATING METHODS THEREOF

(75) Inventor: Ruey-Yuan Tseng, Taipei (TW)

(73) Assignee: Lite-On Technology Corporation, Taipei (TW)

( * ) Notice: Subject to any disclaimer, the term of this patent is extended or adjusted under 35 U.S.C. 154(b) by 854 days.

(21) Appl. No.: 11/237,103

(22) Filed: Sep. 28, 2005

(65) Prior Publication Data

US 2006/0227806 A1    Oct. 12, 2006

(30) Foreign Application Priority Data

Jan. 17, 2005    (TW)    ............... 94101296 A

(51) Int. Cl.
*G06F 9/00*    (2006.01)
(52) U.S. Cl. .......................................... 713/2; 386/124
(58) Field of Classification Search ................. 713/2; 386/124

See application file for complete search history.

(56) References Cited

U.S. PATENT DOCUMENTS

| 2006/0064688 A1* | 3/2006 | Tseng | 718/1 |
| 2006/0101259 A1* | 5/2006 | Chen | 713/2 |
| 2006/0123201 A1* | 6/2006 | Wu | 711/147 |
| 2007/0043938 A1* | 2/2007 | May et al. | 713/2 |

* cited by examiner

*Primary Examiner*—Albert Wang
(74) *Attorney, Agent, or Firm*—Thomas, Kayden, Horstemeyer & Risley

(57) ABSTRACT

Multi-mode computer systems and operating methods thereof. The computer system comprises a storage device and a boot program. The storage device includes a single disk partition comprising a first operating system corresponding to PC mode, and a second OS image and a file system image corresponding to media mode. If an instruction for PC mode is received, the boot program loads the first OS on the computer system, enabling the computer system to operate in PC mode. If an instruction for media mode is received, the boot program starts the computer system according to the second OS image and the file system image, enabling the computer system to operate in media mode.

2 Claims, 4 Drawing Sheets

MULTI-MODE COMPUTER SYSTEMS AND OPERATING METHODS THEREOF

BACKGROUND

The present disclosure relates generally to computer systems and operating methods thereof, and, more particularly, to multi-mode computer systems and operating methods thereof that can operate in different operating modes.

In addition to PC mode, media modes are also available in many computer systems. In PC mode, performance of general operations of a personal computer is available, while in media mode, discs or mp3 can be played, PVR can be recorded, and IR remote controllers are enabled.

A conventional multi-mode computer system is equipped with a large storage device, such as a hard disk, and a small storage device, such as a flash RAM (Random Access Memory). The large storage device installs a conventional OS (Operating System), and the small storage device installs software corresponding to the media mode. In this design, additional hardware costs are required. Additionally, since the access for small storage devices is slower than that for large storage devices, boot process is longer.

Another conventional multi-mode computer system is equipped with a single storage device. The storage device is partitioned into at least two partitions, each storing respective file systems for software in respective operating modes. In this design, if users damage functions of software, these two file systems cannot be correctly handled, copied, and recovered, increasing the difficulty of system maintenance. Additionally, in PC mode, configuration of file system in media mode is vulnerable and this may cause abnormal function in media mode.

SUMMARY

Multi-mode computer systems and operating methods thereof are provided.

An embodiment of a multi-mode computer system comprises a storage device and a boot program. The storage device includes a single disk partition comprising a first OS for PC mode, and a second OS image and a file system image for media mode. If an instruction for PC mode is received, the boot program loads the first OS on the computer system, enabling the computer system to operate in PC mode. If an instruction for media mode is received, the boot program starts the computer system according to the second OS image and the file system image, enabling the computer system to operate in media mode.

If an instruction for media mode is received, the boot program decompresses and expands the second OS image to execute a second OS kernel on the computer system. The second OS kernel launches the file system image for media mode in a Ramdisk method, in which the file system image is decompressed and expanded in a ramdisk of a memory.

The second OS kernel further mounts a file system for PC mode on the file system for media mode, such that data can be permanently stored therein.

In an embodiment of an operating method, a first OS is loaded on a computer system, enabling the computer system to operate in PC mode if an instruction for PC mode is received. The computer system is started according to a second OS image and a file system image for media mode, enabling the computer system to operate in media mode if an instruction for media mode is received.

If an instruction for media mode is received, the second OS image is decompressed and expanded to execute a second OS kernel on the computer system. The second OS kernel launches the file system image for media mode in a Ramdisk method, in which the file system image is decompressed and expanded in a ramdisk of a memory.

The second OS kernel further mounts a file system for PC mode on the file system for media mode extracted from the file system image.

Multi-mode computer systems and operating methods thereof may take the form of program code embodied in tangible media. When the program code is loaded into and executed by a machine, the machine becomes an apparatus for practicing the disclosed method.

DESCRIPTION OF THE DRAWINGS

The invention will become more fully understood by referring to the following detailed description with reference to the accompanying drawings, wherein.

DESCRIPTION

Multi-mode computer systems and operating methods thereof are provided.

Figure 1:
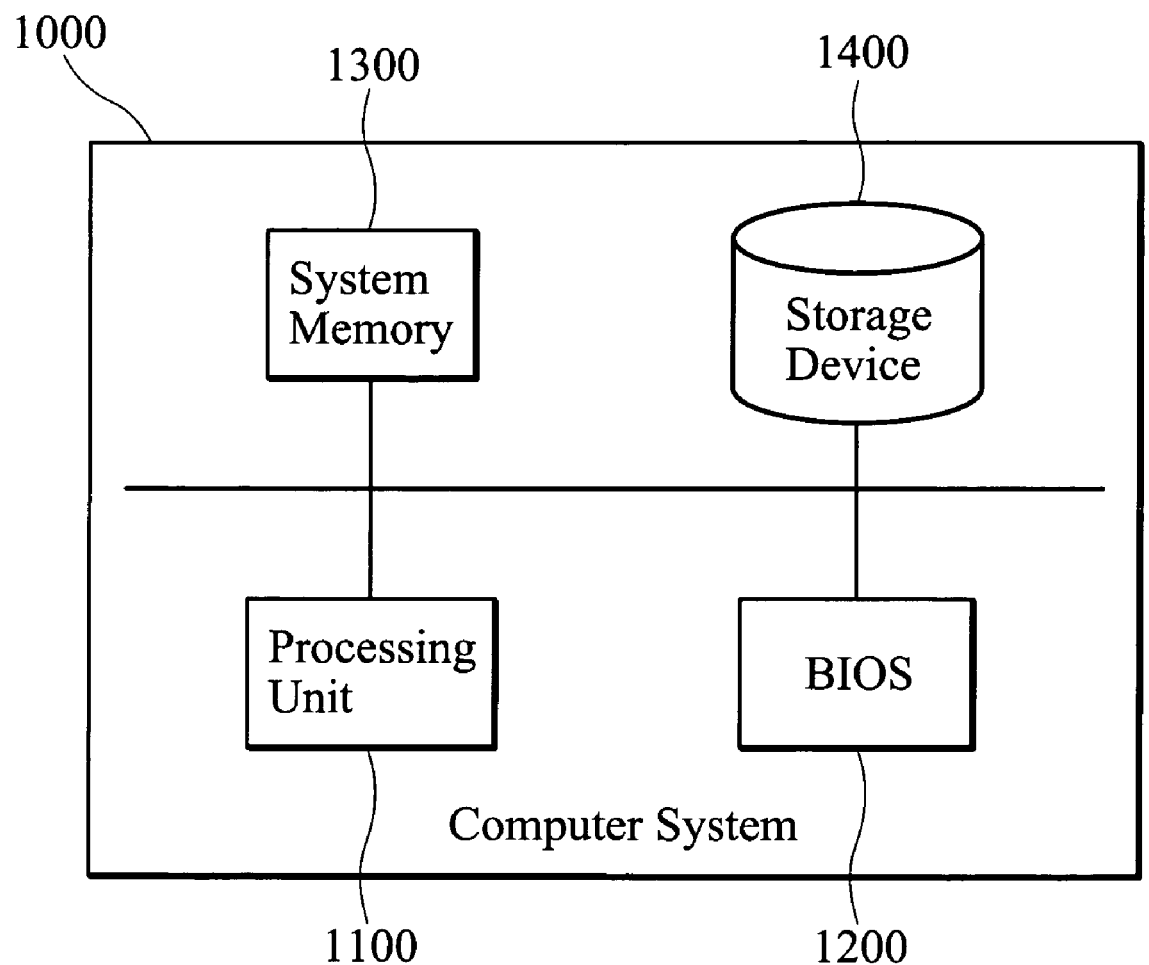
FIG. 1 is a schematic diagram illustrating an embodiment of a computer system.

FIG. 1 is a schematic diagram illustrating an embodiment of a computer system.

The computer system 1000 comprises a processing unit 1100, a BIOS (Basic Input/Output System) 1200, a system memory 1300, and a storage device 1400. It is understood that the computer system 1000 further comprises related devices, such as a CD-ROM drive, an IR reception device, USBs (Universal Serial Buses), a TV controller, a Web Cam, an IR remote controller, and others. The computer system 1000 further comprises an output device, such as a TV and a monitor.

Figure 2:
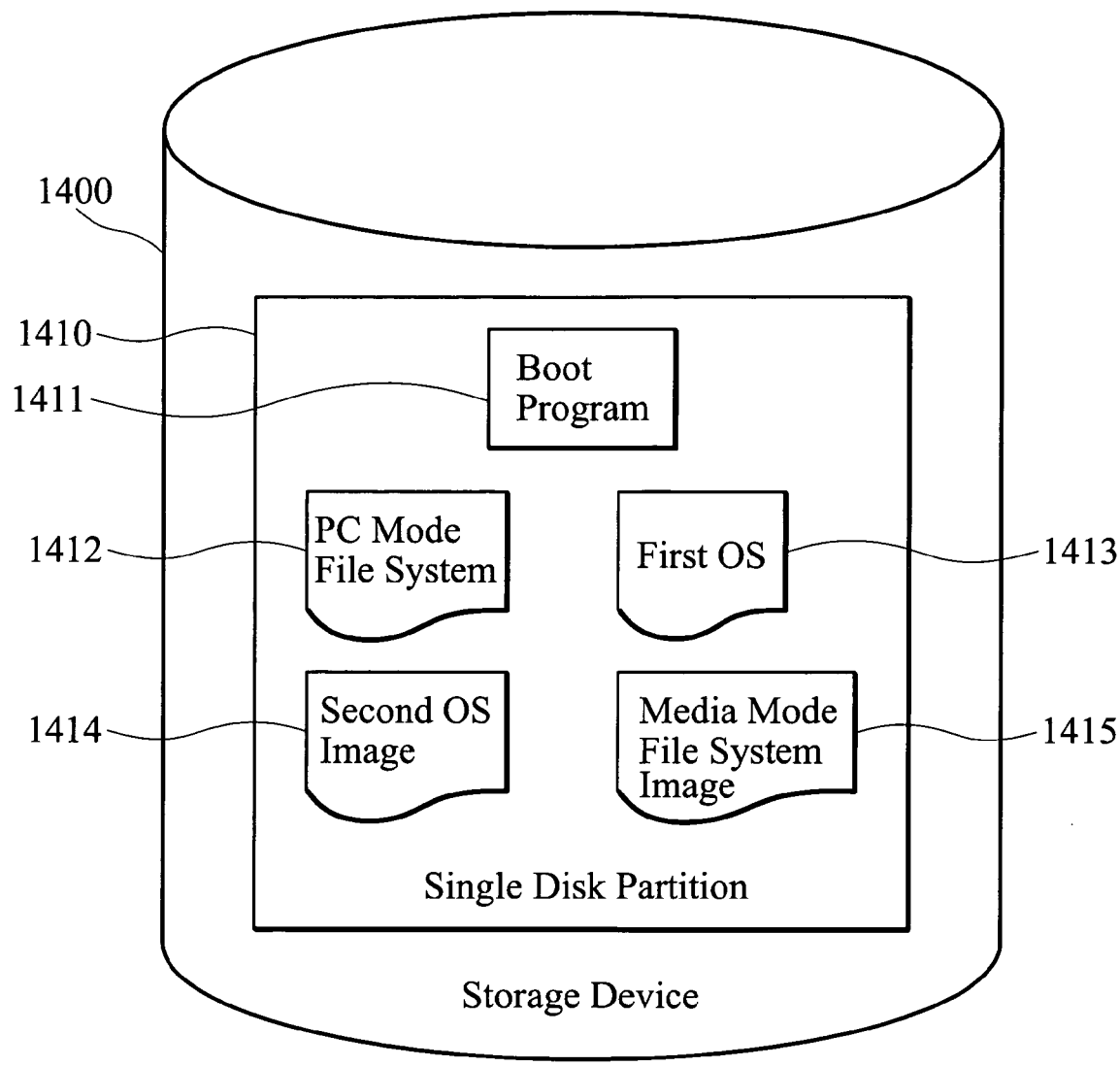
FIG. 2 is a schematic diagram illustrating an embodiment of a storage device in the computer system.

The processing unit 1100 performs related operations, such as booting procedures of the computer system 1000. The BIOS 1200 provides basic functions on the computer systems, such as input and output, configuration, and POST (Power On Self Test) functions. The system memory 1300 may be a RAM (Random Access Memory) storing programs executed and related data required during operating of the computer system 1000. The storage device 1400 may be a hard disk comprising a single disk partition 1410, as shown in FIG. 2.

The single partition disk 1410 comprises a boot program 1411, a file system for PC mode 1412, a first OS 1413, a second OS image 1414, and a file system image for media mode 1415. The boot program 1411 may be a multi-OS loader, loaded and executed by the BIOS 1200 to perform the boot procedure of the computer system 1000. When the computer system 1000 boots, the boot program 1411 performs related determinations and enables the computer system 1000 to enter and operate in PC mode or media mode. The file system for PC mode 1412 is the file system for PC mode, such as Microsoft Windows NTFS or FAT32. The first OS 1413 is an operating system for PC mode, such as Microsoft Windows 32, 95, 98, 2000, NT, XP and others. The second OS image 1414 is an image, decompressed and expanded as a second OS for execution in the system memory 1300. The second OS is an operating system for media mode, such as Microsoft Windows CE or embedded Linux system. The file system image for media mode 1415 is an image of a root file system, decompressed and expanded as a file system to execute in the system memory 1300. The file system for media mode is the file system of the computer system 1000 in the media mode, such as FAT, Ext2, Ext3, Minix, and others.

It is understood that the file system image for media mode 1415 is an image using Ramdisk technique. The related file system, applications, and system content corresponding to media mode can be placed in a ramdisk, and the ramdisk can be packed and compressed as an image. Additionally, since the storage device 1400 comprises a single partition, the second OS image 1414 and the file system image for media mode 1415 are embedded into the file system for PC mode 1412 as normal files.

Figure 3:
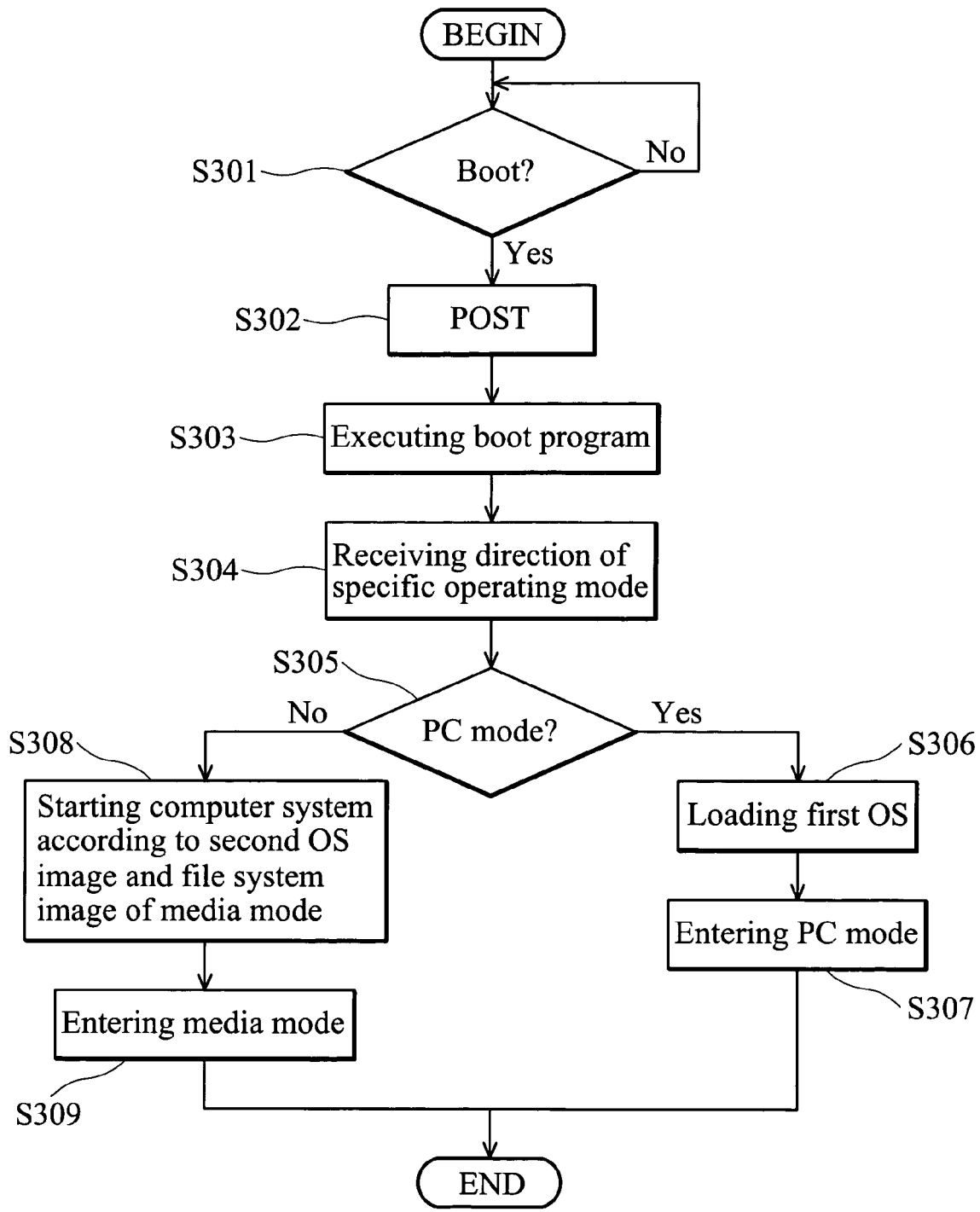
FIG. 3 is a flowchart of an embodiment of a booting procedure.

FIG. 3 is a flowchart of an embodiment of a booting procedure.

In step S301, it is determined whether the computer system 1000 has booted. If not, the procedure remains at step S301. If so (Yes in step S301), it goes to step S302, in which the BIOS 1200 performs POST, and in step S303, executes the boot program 1411. In step S304, an instruction of a specific operating mode is received. It is understood that the instructions of specific operating modes can be implemented in various methods. For example, the instructions can be selected from menus, or predefined corresponding keys.

If an instruction for PC mode is received (Yes in step S305), it goes to step S306, in which the first OS 1413 is loaded onto the computer system 1000, and in step S307, the computer system enters and operates in PC mode. If an instruction for media mode is received (No in step S305), it goes to step S308, in which the computer system 1000 is started according to the second OS image 1414 and the file system image for media mode 1415, and in step S309, the computer system enters and operates in media mode. It is understood that the file system for PC mode 1412 is loaded and executed on the computer system 1000, whenever in PC mode and media mode.

Figure 4:
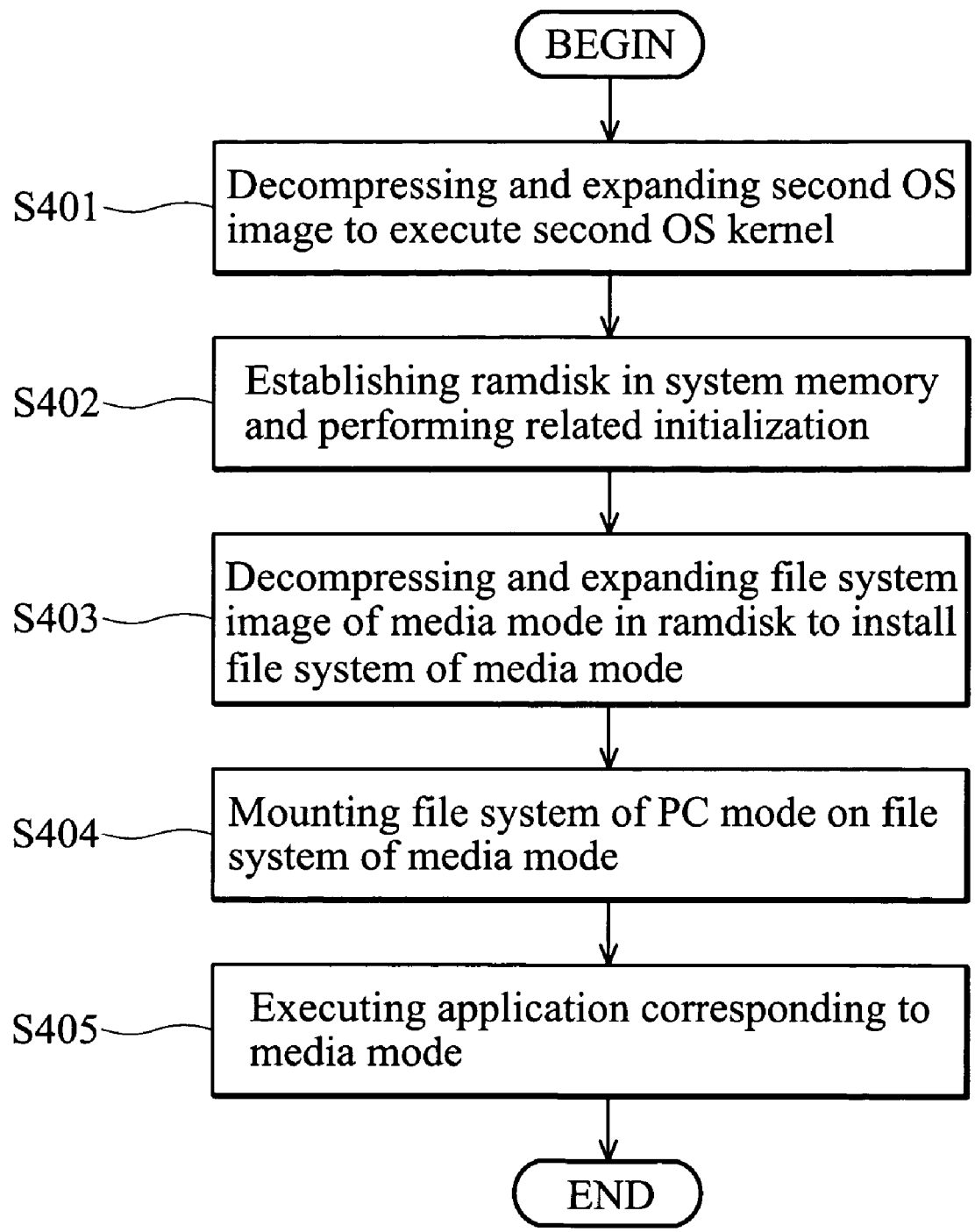
FIG. 4 is a flowchart of an embodiment of a booting procedure for media mode.

FIG. 4 is a flowchart of an embodiment of a boot procedure for media mode.

If an instruction for media mode is received, in step S401, the second OS image 1414 is decompressed and expanded to execute a second OS kernel on the computer system 1000. In step S402, a ramdisk is established in the system memory 1300, and related initialization is performed. In step S403, the file system image for media mode 1415 is decompressed and expanded in the ramdisk to install the file system for media mode on the computer system 1000. In step S404, the file system for PC mode 1412 is mounted on the file system for media mode. In step S405, at least one application (not shown) corresponding to media mode is executed. It is understood that the application can permanently store related data via the mounted file system for PC mode 1412. For example, TV programs recorded in media mode can be stored via the mounted file system. Further, since the file system image for media mode 1415 is an image using Ramdisk technique, the file system image for media mode can be launched in a Ramdisk method directly, such that the ramdisk initialization and image expansion are executed automatically.

In the invention, the computer system can utilize a storage device comprising a single disk partition and a file system to store and manage independent operating systems corresponding to different operating modes, reducing related system costs. Additionally, since the same file system is accessed irrespective of PC mode or media mode, the conventional risk of deletion or modification of file system for media mode in PC mode is avoided. Further, related data for different operating modes is accessed from the same storage device, making boot procedures more efficient.

Multi-mode computer systems and operating methods thereof, or certain aspects or portions thereof, may take the form of program code. (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A multi-mode computer system, comprising:
   a storage device comprising a single disk partition, wherein the single disk partition further comprises:
      a first OS for PC mode;
      a file system for PC mode;
      a second OS image for media mode;
      a file system image for media mode; and
      a boot program for performing a boot procedure; and
   a BIOS loading the boot program and executing the boot procedure by:
      if an instruction for PC mode is received, loading the first OS on the computer system to enable the computer system to operate in PC mode; and
      if an instruction for media mode is receive, starting the computer system by decompressing and expanding the second OS image to execute a second OS kernel on the computer system,
   wherein using a Ramdisk technique, the second OS kernel decompresses and expands the file system image for media mode into a system memory to create a file system for media mode in the system memory, generates a mapping relationship between the file system for PC mode and the created file system for media mode in the system memory, and during operation in media mode, stores data generated by an application executed in media mode to the storage device based on the mapping relationship.

2. An operating method for use in a multi-mode computer system, comprising a storage device comprising a single disk partition comprising a first OS for PC mode, a file system for PC mode, a second OS image for media mode, and a file system image for media mode, the method comprising:
   if an instruction for PC mode is received, loading the first OS on the computer system to enable the computer system to operate in PC mode; and
   if an instruction for media mode is received, starting the computer system according to the second OS image and the file system image for media mode to enable the computer system to operate in media mode by:

decompressing and expanding the second OS image for media mode to execute a second OS kernel on the computer system;

using a Ramdisk technique to decompress and expand the file system image for media mode into a system memory to create a file system for media mode in the system memory; and generating a mapping relationship between the file system for PC mode and the created file system for media mode; and wherein during operation in media mode, stores data generated by an application executed in media mode to the storage device based on the mapping relationship.

* * * * *